US012629589B2

(12) United States Patent
Poitrey et al.

(10) Patent No.: US 12,629,589 B2
(45) Date of Patent: May 19, 2026

(54) SYSTEMS AND METHODS FOR DISPLAYING CUSTOM-BUILT LAYOUTS ON A SECOND SCREEN DEVICE THAT HAS BEEN CONVERTED TO A VIDEO GAME CONTROLLER

(71) Applicant: Netflix, Inc., Los Gatos, CA (US)

(72) Inventors: Olivier Jean Poitrey, Le Chesnay (FR); James Smith, Los Gatos, CA (US); Chase Rubin Meuse, Woodbury, MN (US)

(73) Assignee: Netflix, Inc., Los Gatos, CA (US)

( * ) Notice: Subject to any disclaimer, the term of this patent is extended or adjusted under 35 U.S.C. 154(b) by 173 days.

(21) Appl. No.: 18/482,648

(22) Filed: Oct. 6, 2023

(65) Prior Publication Data

US 2025/0114691 A1     Apr. 10, 2025

(51) Int. Cl.
*A63F 13/22*          (2014.01)
*A63F 13/2145*        (2014.01)

(52) U.S. Cl.
CPC .......... *A63F 13/22* (2014.09); *A63F 13/2145* (2014.09)

(58) Field of Classification Search
CPC ...... A63F 13/22; A63F 13/2145; A63F 13/42; A63F 13/533; A63F 13/211; A63F 13/215; A63F 13/537; A63F 13/26
See application file for complete search history.

(56) References Cited

U.S. PATENT DOCUMENTS

| | | |
|---|---|---|
| 2013/0154958 A1 | 6/2013 | Clavin |
| 2020/0001177 A1 | 1/2020 | Champy |
| 2020/0387297 A1 | 12/2020 | Wheeler |
| 2023/0211235 A1* | 7/2023 | Xu ......................... A63F 13/213 |
| | | 463/31 |

OTHER PUBLICATIONS

International Search Report and Written Opinion for International PCT Application No. PCT/US2024/049770, mailed Jan. 24, 2025; 10-pages.

* cited by examiner

*Primary Examiner* — Peter J Iannuzzi
(74) *Attorney, Agent, or Firm* — Hogan Lovells US LLP

(57)          ABSTRACT

The disclosed computer-implemented methods and systems cause a second screen device to display custom-built layouts once the second screen device has been converted to a video game controller. For example, the disclosed methods and system convert the second screen device to a video game controller for a video game being supported by a digital content system and displayed on a separate first screen device. In response to detecting a trigger event, the disclosed methods and systems replace a standard layout on the second screen device with a custom-built layout. Where the standard layout is limited to standard video game controls at standard positions, the custom-built layout includes any type combination of customized video game controls, colors, graphics, animations, and so forth. Various other methods, systems, and computer-readable media are also disclosed.

20 Claims, 12 Drawing Sheets

200

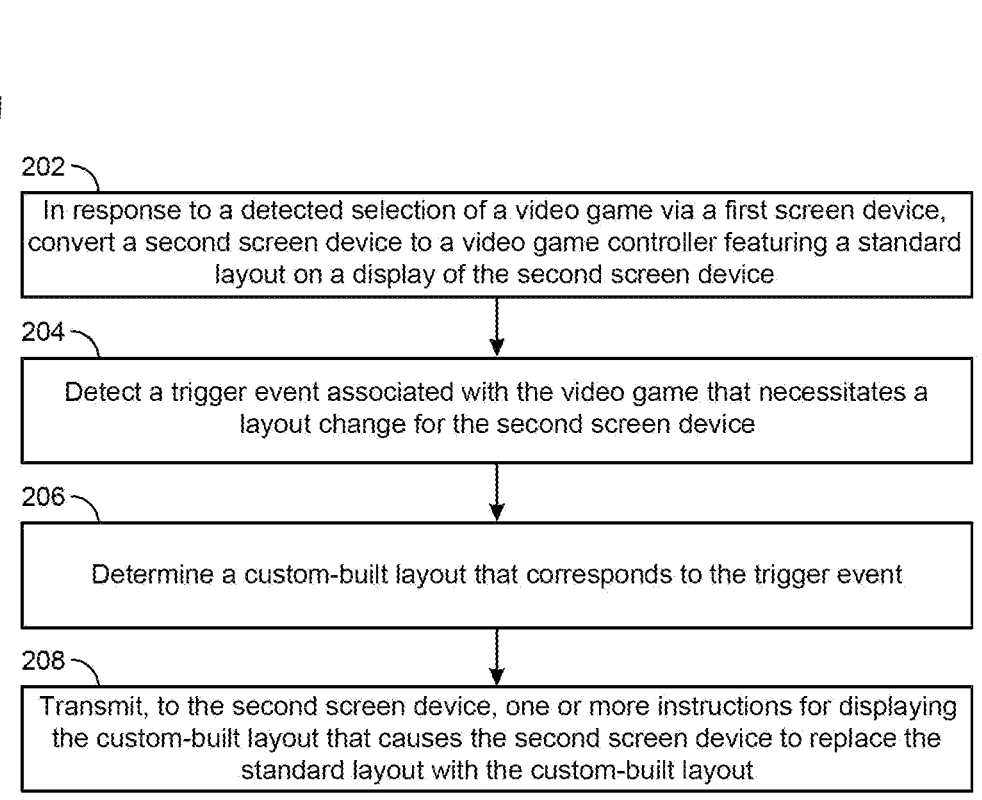

202

In response to a detected selection of a video game via a first screen device, convert a second screen device to a video game controller featuring a standard layout on a display of the second screen device

204

Detect a trigger event associated with the video game that necessitates a layout change for the second screen device

206

Determine a custom-built layout that corresponds to the trigger event

208

Transmit, to the second screen device, one or more instructions for displaying the custom-built layout that causes the second screen device to replace the standard layout with the custom-built layout

*FIG. 2*

SYSTEMS AND METHODS FOR DISPLAYING CUSTOM-BUILT LAYOUTS ON A SECOND SCREEN DEVICE THAT HAS BEEN CONVERTED TO A VIDEO GAME CONTROLLER

Video games continue to be a popular and pervasive form of entertainment. Video gaming platforms continually seek to create video games that are faster, more exciting, and more immersive. Typically, a video game is played on a game console or computer that displays game graphics via a display device such as a TV or monitor, while a player interacts with the displayed game via a physical controller or other input device. Video game controllers generally include a collection of physical buttons, joysticks, track pads, paddles, and so forth. As such, typical video game controllers are rigidly tied to a single layout of dedicated buttons, joysticks, etc. In light of this, video game creators are similarly tied to the limitations of the physical video game controller.

In some instances, such as with mobile gaming, a video game may include buttons and other controls that are displayed on a touch screen. This layout of buttons and controls, however, is often positioned on top of the game graphics within the same mobile display. As such, the game controls typically block game graphics and/or otherwise limit the useability and immersiveness of the video game as it is played on a mobile device with a smaller display screen.

SUMMARY

As will be described in greater detail below, the present disclosure describes implementations that cause a second screen device to be converted to a video game controller and display a custom-built layout that is specific to a particular video game. For example, implementations include, in response to a detected selection of a video game via a first screen device, converting a second screen device to a video game controller featuring a standard layout on a display of the second screen device, detecting a trigger event associated with the video game that necessitates a layout change for the second screen device, determining a custom-built layout that corresponds to the trigger event, and transmitting, to the second screen device, one or more instructions for displaying the custom-built layout that causes the second screen device to replace the standard layout with the custom-built layout.

In some implementations, the standard layout emulates a physical video game controller and the custom-built layout provides unique second screen device controller functionality including one or more of rich user interactions or hidden information gameplay. Additionally, in some implementations, rich user interactions include one or more of swipe touch gestures on the second screen device, zoom touch gestures on the second screen device, drag-and-drop touch gestures on the second screen device, pan touch gestures on the second screen device, displayed object rotation touch gestures on the second screen device, gyroscopic interactions using the second screen device, or microphone interactions using the second screen device. Moreover, in some implementations, hidden information gameplay includes video game information that is displayed only on the second screen device and not on the first screen device or any other device being used as a video game controller relative to the video game.

In one or more implementations, detecting the trigger event includes detecting one of a user-initiated trigger event or a video game context-initiated trigger event. Additionally, in some implementations, detecting a user-initiated trigger event includes one or more of detecting a user selection of one or more controls within the standard layout. Moreover, in some implementations, detecting a video game context-initiated trigger event includes detecting that current gameplay of the video game has reached a predetermined point. At least one implementation further includes detecting an additional trigger event associated with the video game, and in response to the additional trigger event, causing the display of the second screen device to return to the standard layout.

Some examples described herein include a system with at least one physical processor and physical memory including computer-executable instructions that, when executed by the at least one physical processor, cause the at least one physical processor to perform various acts. In at least one example, the computer-executable instructions, when executed by the at least one physical processor, cause the at least one physical processor to perform acts including, in response to a detected selection of a video game via a first screen device, converting a second screen device to a video game controller featuring a standard layout on a display of the second screen device, detecting a trigger event associated with the video game that necessitates a layout change for the second screen device, determining a custom-built layout that corresponds to the trigger event, and transmitting, to the second screen device, one or more instructions for displaying the custom-built layout that causes the second screen device to replace the standard layout with the custom-built layout.

In some examples, the above-described method is encoded as computer-readable instructions on a computer-readable medium. In one example, the computer-readable instructions, when executed by at least one processor of a computing device, cause the computing device to, in response to a detected selection of a video game via a first screen device, converting a second screen device to a video game controller featuring a standard layout on a display of the second screen device, detecting a trigger event associated with the video game that necessitates a layout change for the second screen device, determining a custom-built layout that corresponds to the trigger event, and transmitting, to the second screen device, one or more instructions for displaying the custom-built layout that causes the second screen device to replace the standard layout with the custom-built layout.

In some examples, the above-described method is encoded as computer-readable instructions on a computer-readable medium. In one example, the computer-readable instructions, when executed by at least one processor of a computing device, cause the computing device to, in response to a detected selection of a video game via a first screen device, convert a second screen device to a video game controller featuring a standard layout on a display of the second screen device, detect a trigger event associated with the video game that necessitates a layout change for the second screen device, determine a custom-built layout that corresponds to the trigger event, and transmit, to the second screen device, one or more instructions for displaying the custom-built layout that causes the second screen device to replace the standard layout with the custom-built layout.

In one or more examples, features from any of the implementations described herein are used in combination with one another in accordance with the general principles described herein. These and other implementations, features, and advantages will be more fully understood upon reading the following detailed description in conjunction with the accompanying drawings and claims.

BRIEF DESCRIPTION OF THE DRAWINGS

The accompanying drawings illustrate a number of exemplary implementations and are a part of the specification. Together with the following description, these drawings demonstrate and explain various principles of the present disclosure.

FIG. 2 is a flow diagram of an exemplary computer-implemented method for causing a second screen device to display a custom-built layout in accordance with one or more implementations.

Figure 1:
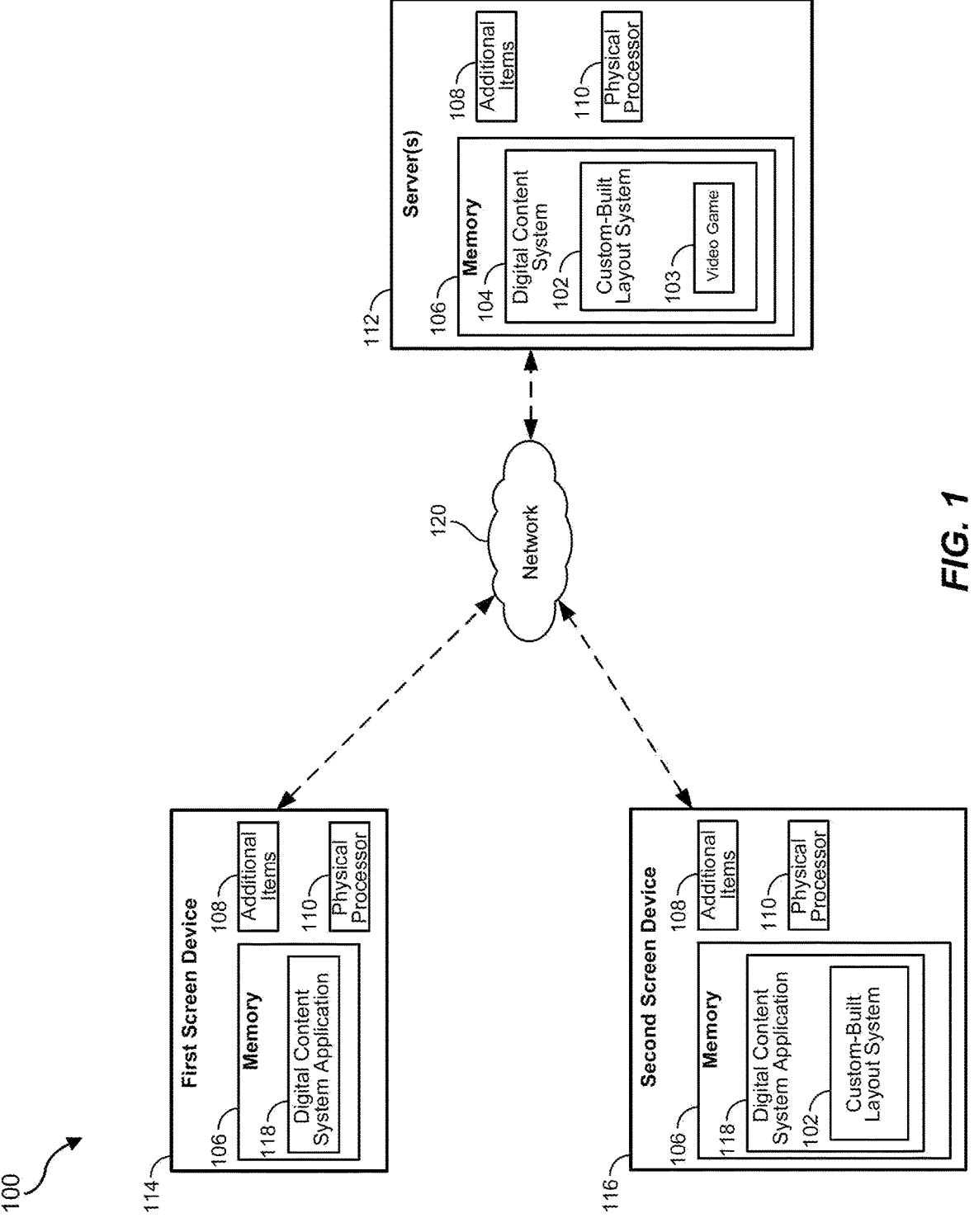
FIG. 1 is a block diagram of an exemplary environment for implementing a custom-built layout system in accordance with one or more implementations.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION OF EXEMPLARY EMBODIMENTS

As mentioned above, a video game platform is typically limited to the layout and functionality of the physical video game controller that is specific to that video game platform. As such, gameplay on that video game platform must be tailored to that physical controller. This, in turn, means that use of the physical controller while playing a particular video game is often non-intuitive or may even leave various buttons and other controls on the physical controller with no functionality at all. The mobile gaming space (i.e., where physical controllers may not be used) is also problematic because the digital controls for a video game are generally displayed on the same screen as the video game graphics. This typically leads to a reduction in viewable display area for the video game and smaller controller sizes (e.g., for buttons, joysticks, etc.). As such, mobile video games are often less immersive and harder to play.

In light of these problems, the present disclosure describes a system that generates dynamic, custom-built layouts of interactive elements and other data for use on a second screen device such as a smartphone during video gameplay. For example, the described system converts a player's smartphone into a second screen device that is used as a video game controller for a video game being displayed on a first screen device such as a TV. The described system also detects trigger events that necessitate a change to the layout displayed on the smartphone while it is used as a second screen device. To illustrate, the described system displays a custom-built layout that provides the player with customized functionality that is tailored to specific video game events (e.g., when encountering a particular level or point in a story, character, item, etc.) in real time. In another example, the described system displays a custom-built layout including different or additional functionality in response to a user-initiated event such as selecting a particular button within a standard layout on the second screen device.

The customized and adaptive custom-built layouts generated by the described system enhance gameplay by being presented on a second screen device that is separate from display of the game graphics. This means that gameplay on the first screen device (e.g., a TV) is not limited or interrupted by elements displayed on the user's smartphone. Moreover, the described systems provide custom-built layouts asymmetrically; enabling one player in a group of players to view and interact with video game elements (e.g., interactive controls, icons, and other data) and other video game information only on their second screen device. This functionality gives rise to a new type of video gameplay that enables group video games to engage players in hidden information gameplay. In light of all this, the present disclosure enables video game developers to create immersive, interactive, and dynamically adaptive video game experiences and layout schemes that enhance the experience of end users while keeping the video game controller as concise and game specific as possible. In other words, the present disclosure enables the creation and implementation of second screen device layouts that enable video game players have customized interactions with video game information displayed only on the second screen device—in addition to other interactions with video game elements (e.g., video game characters) displayed on a first screen device.

Features from any of the implementations described herein may be used in combination with one another in accordance with the general principles described herein. These and other implementations, features, and advantages will be more fully understood upon reading the following detailed description in conjunction with the accompanying drawings and claims.

Figure 3A:
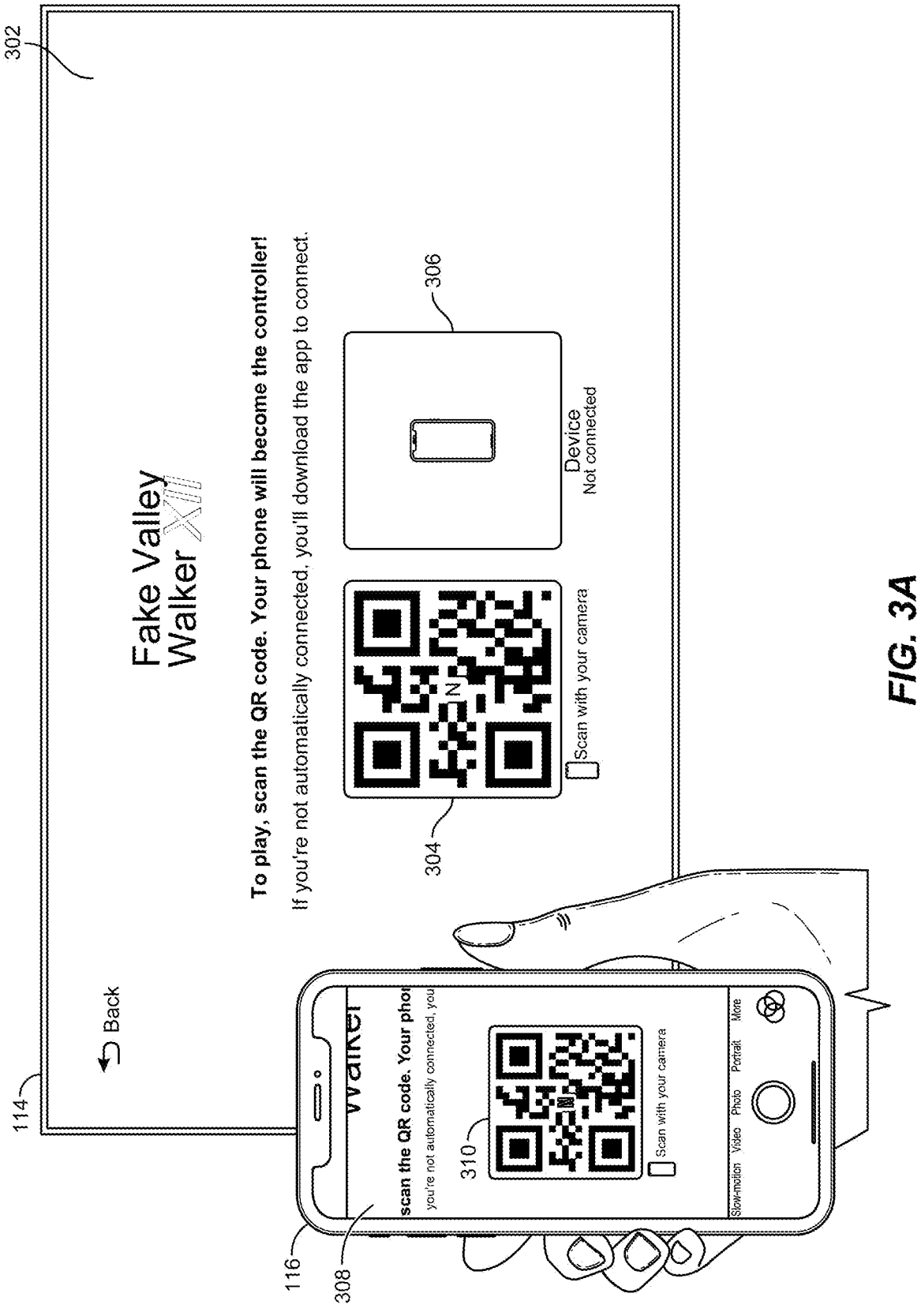
FIGS. 3A-3M illustrate custom-built layouts generated by the custom-built layout system on a second screen device in accordance with one or more implementations.
Figure 3B:
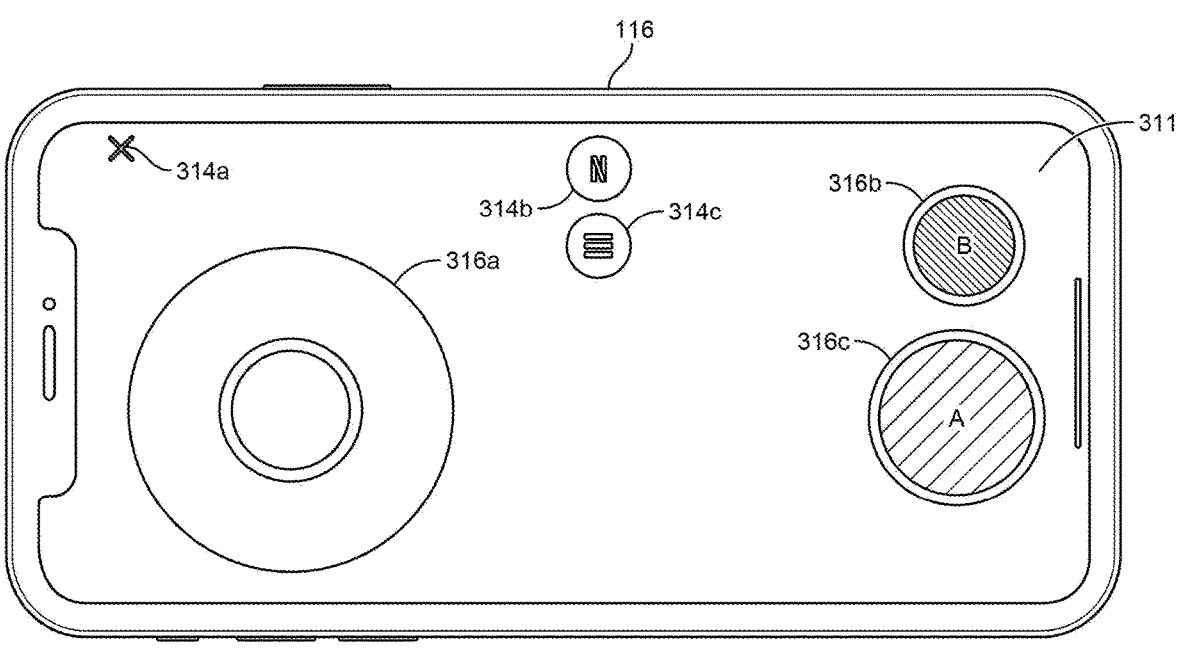
Figure 3C:
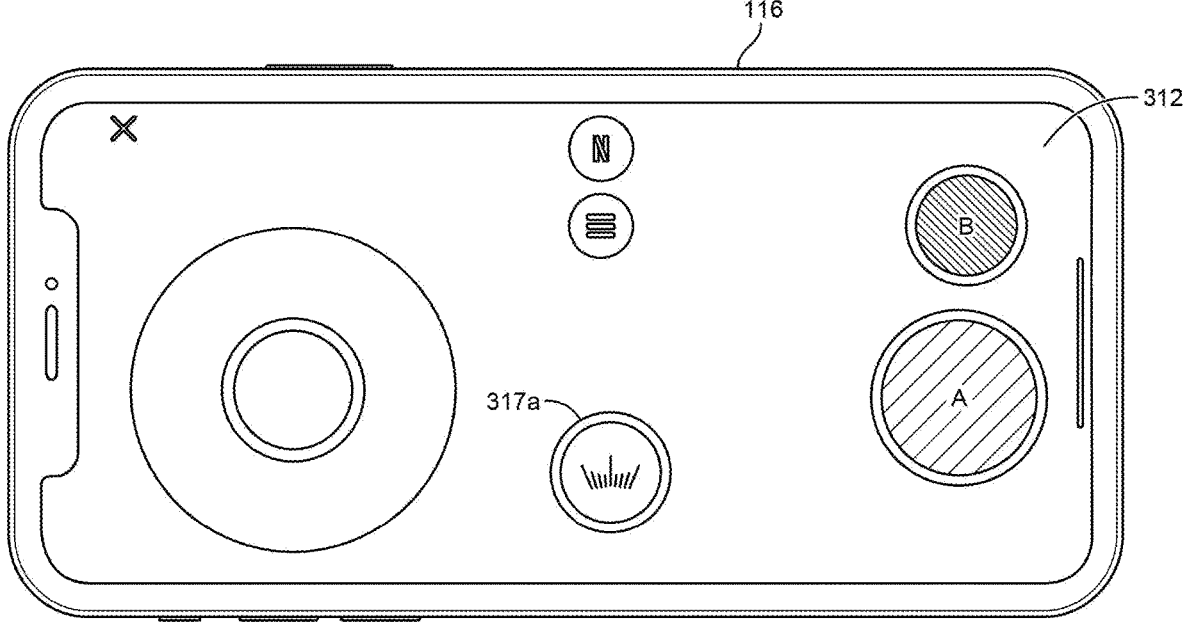
Figure 3D:
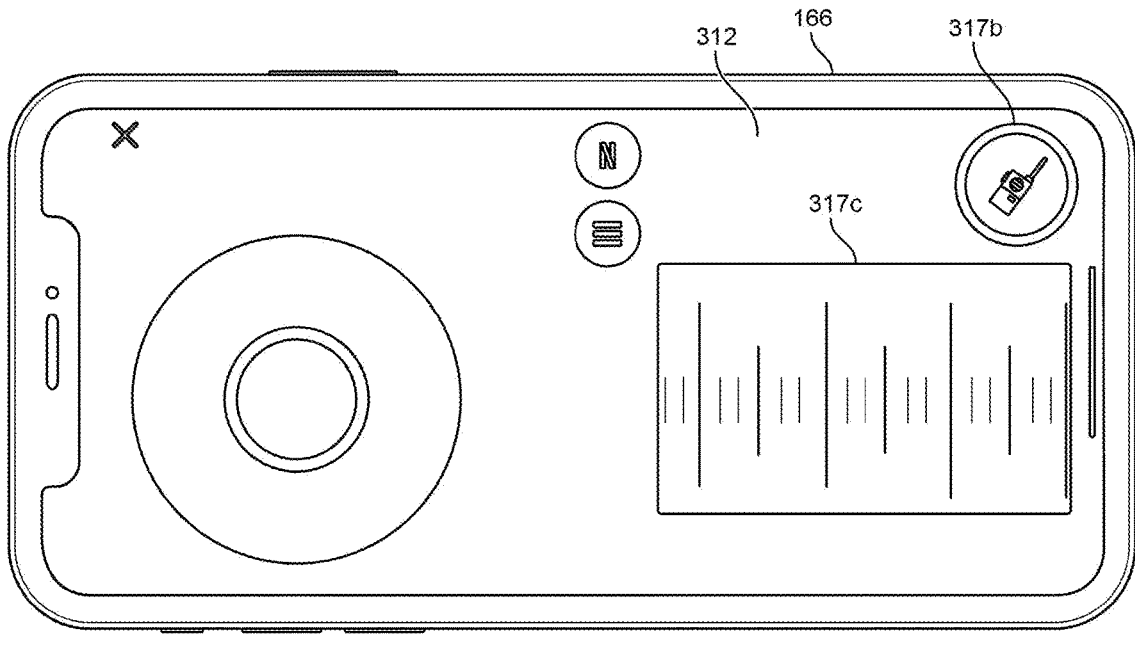
Figure 3E:
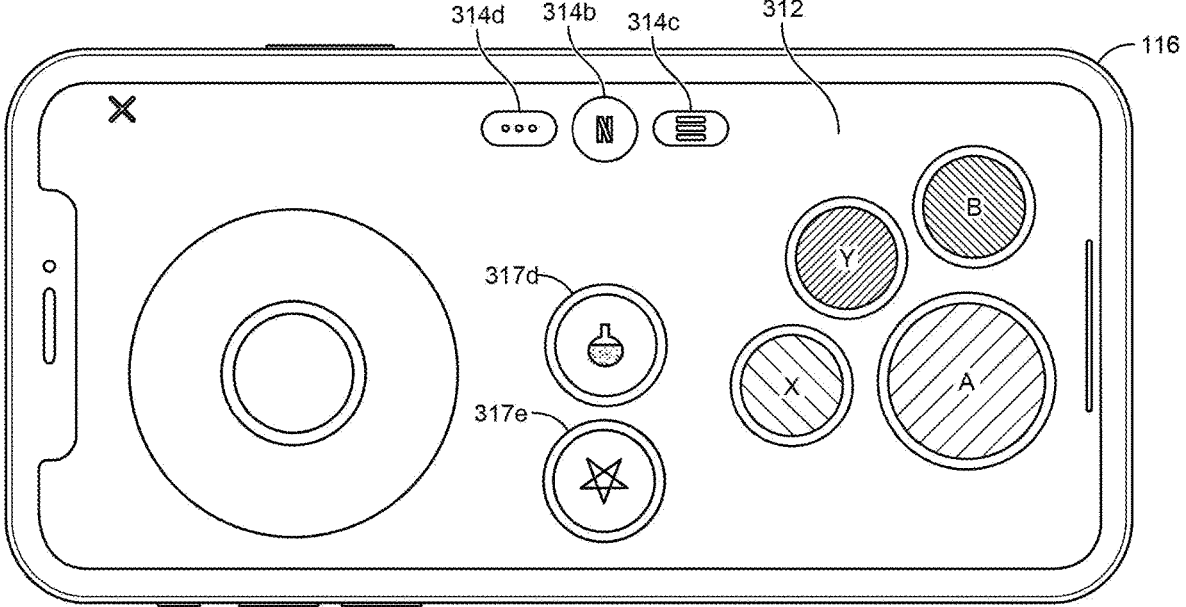
Figure 3F:
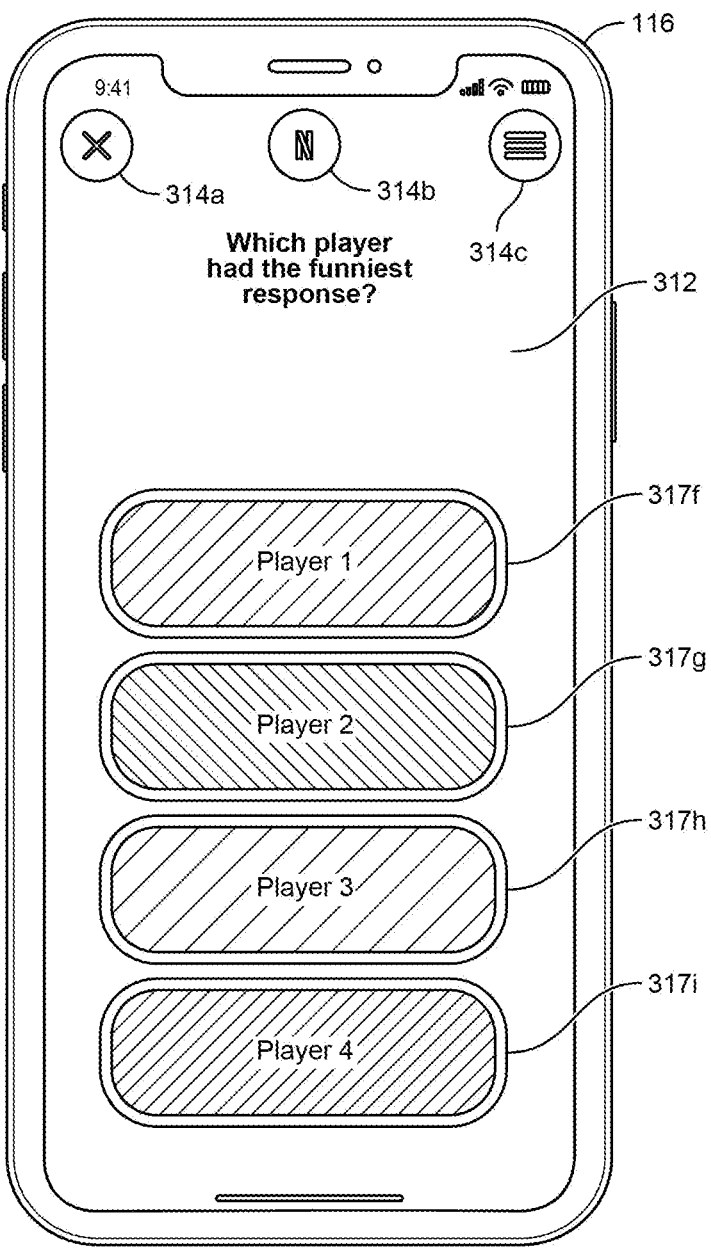
Figure 3G:
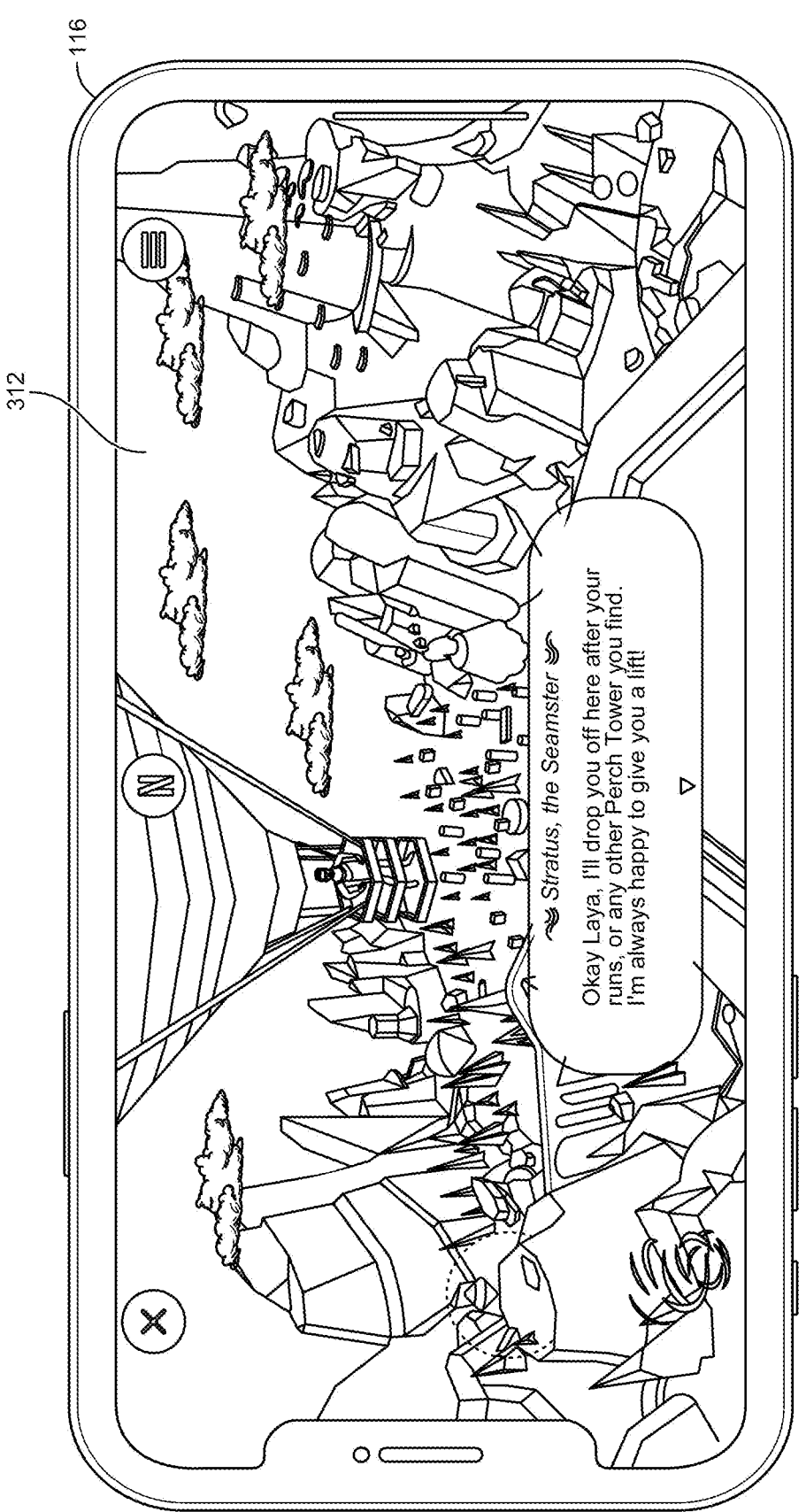
Figure 3H:
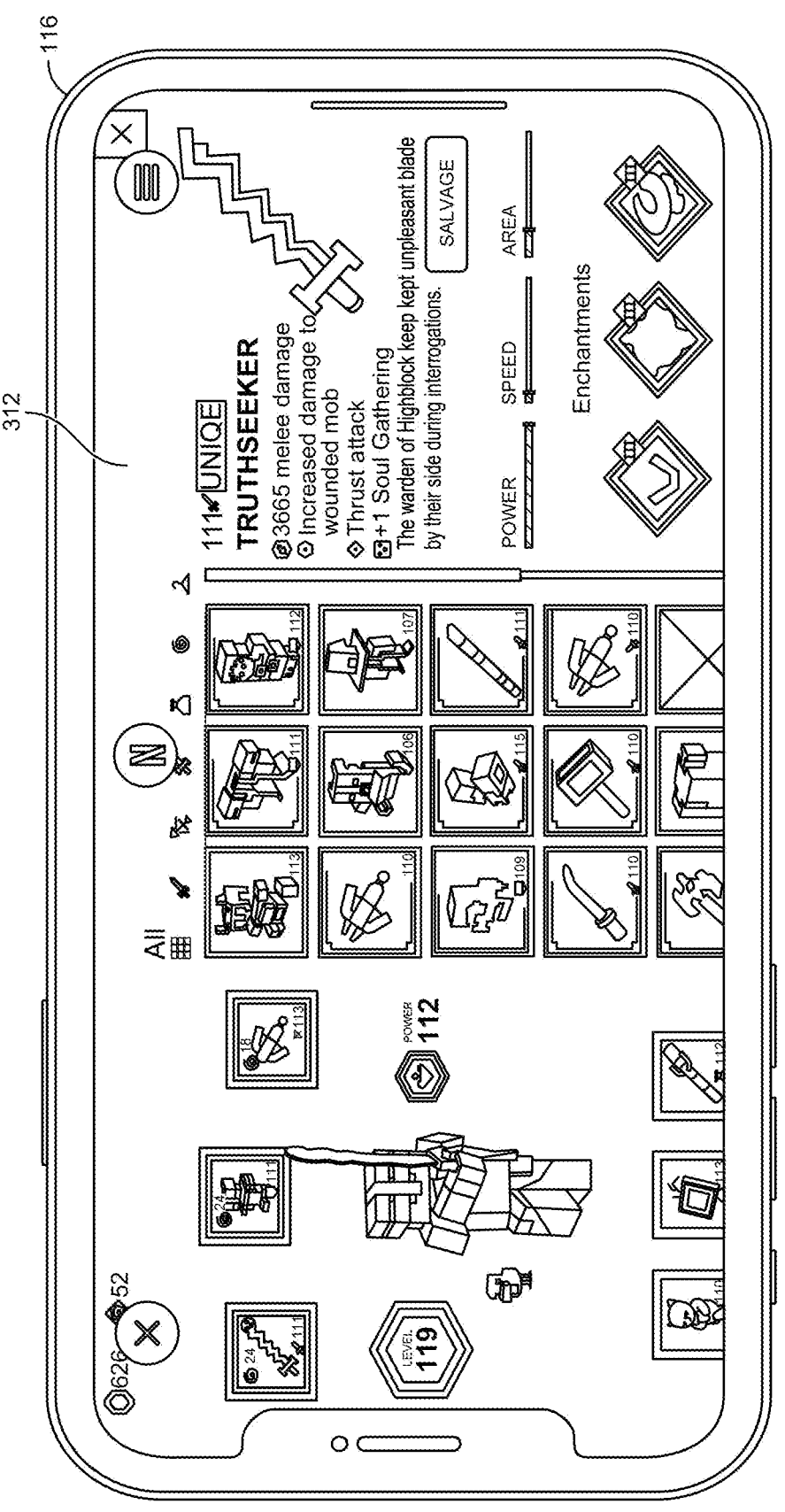
Figure 3J:
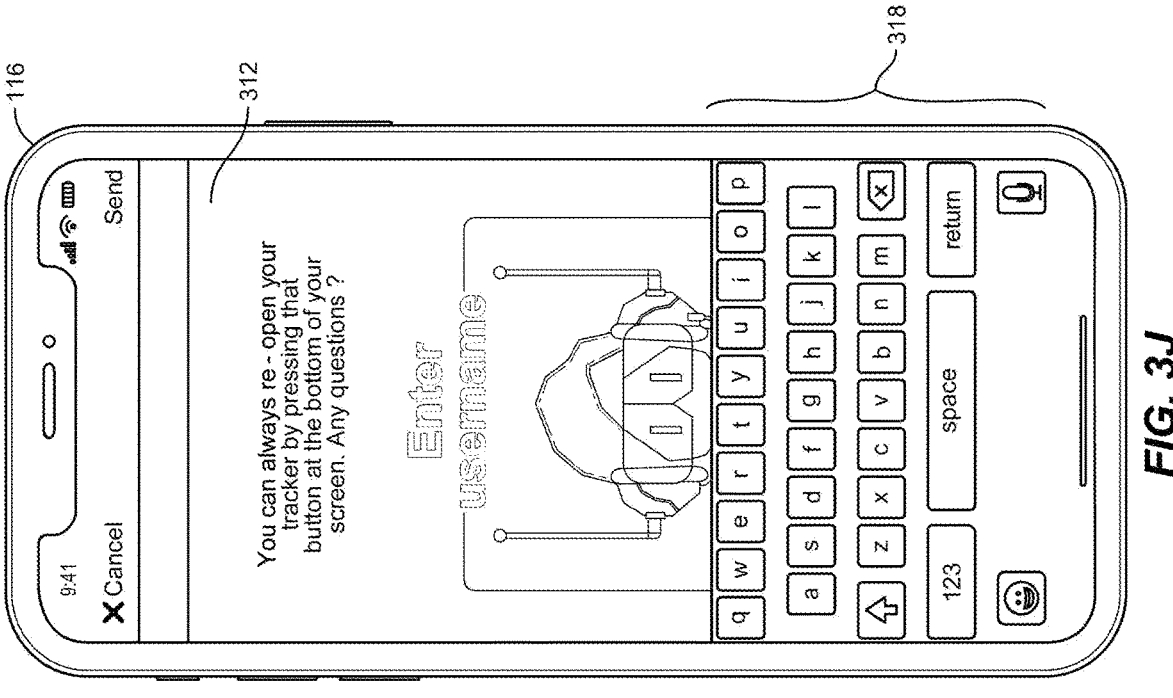
Figure 3I:
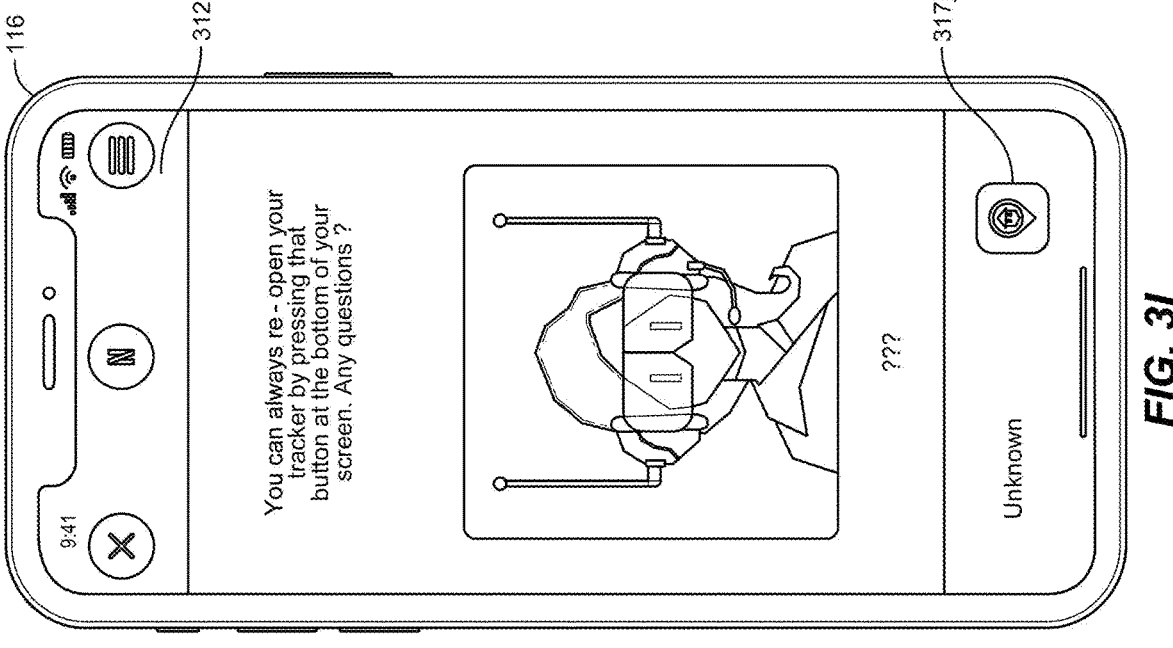
Figures 3K, 3L:
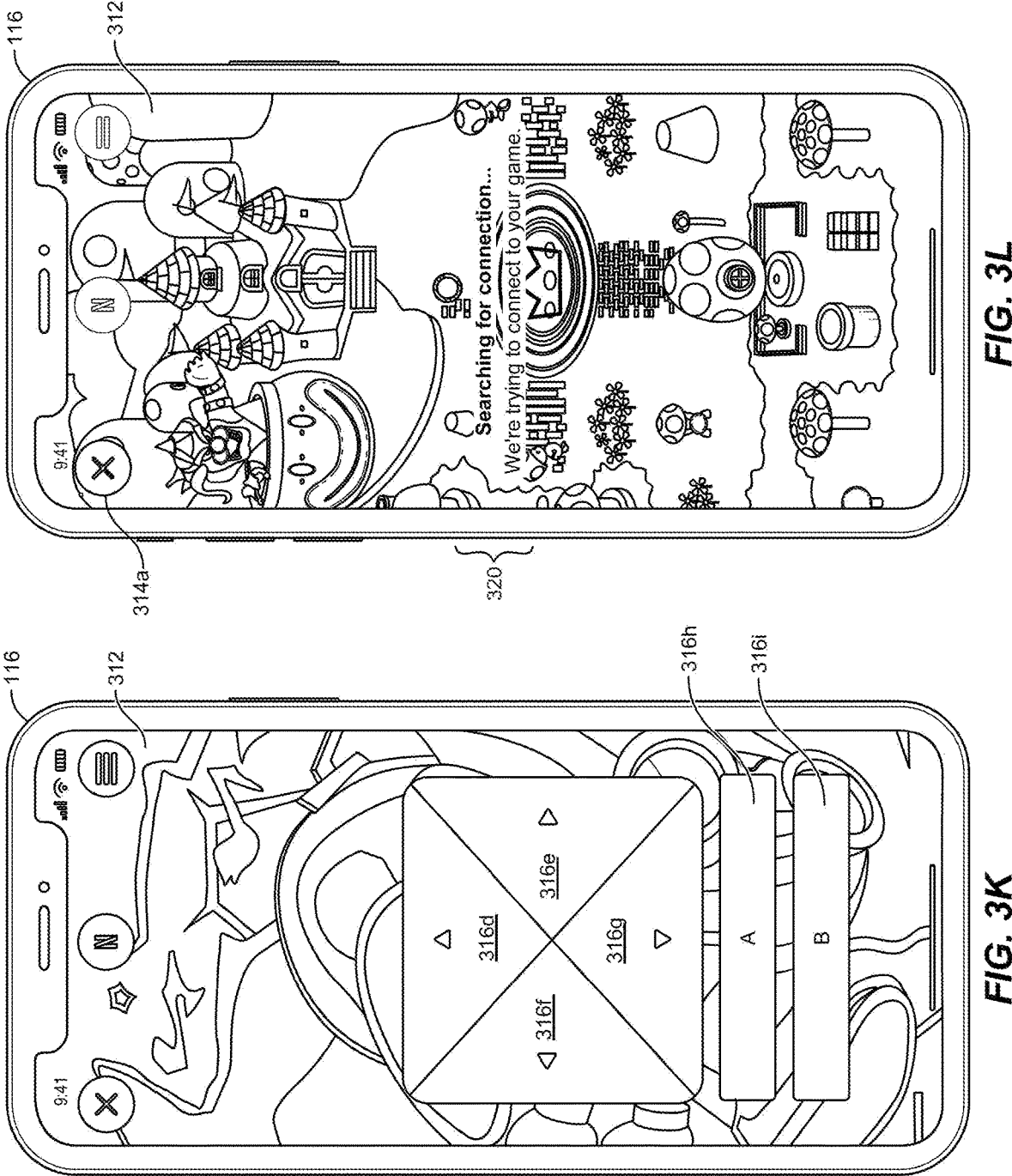
Figure 3M:
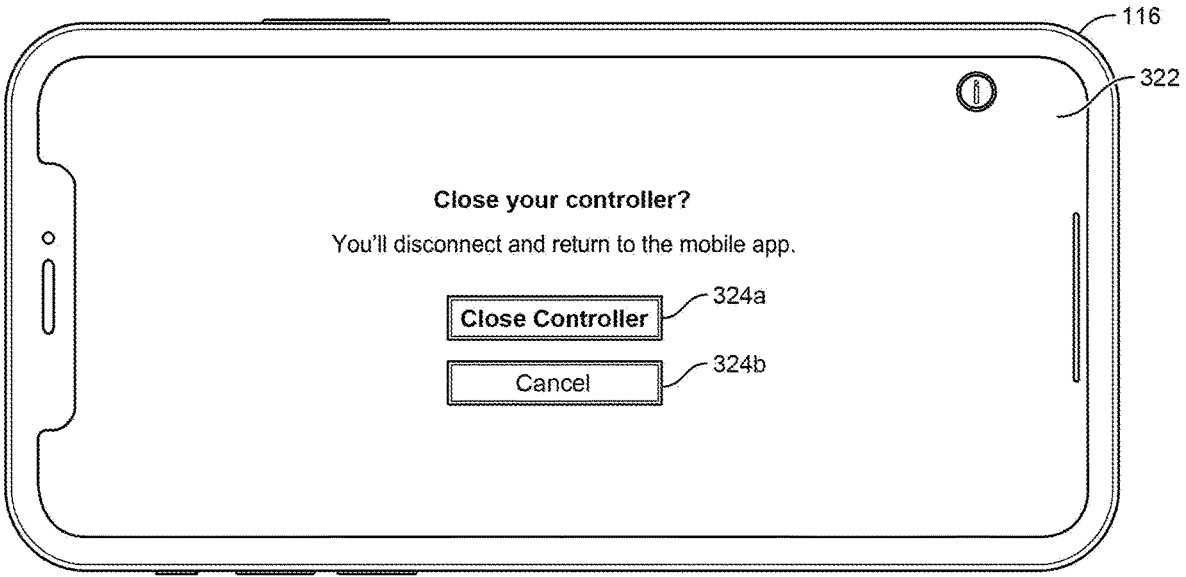
Figure 4:
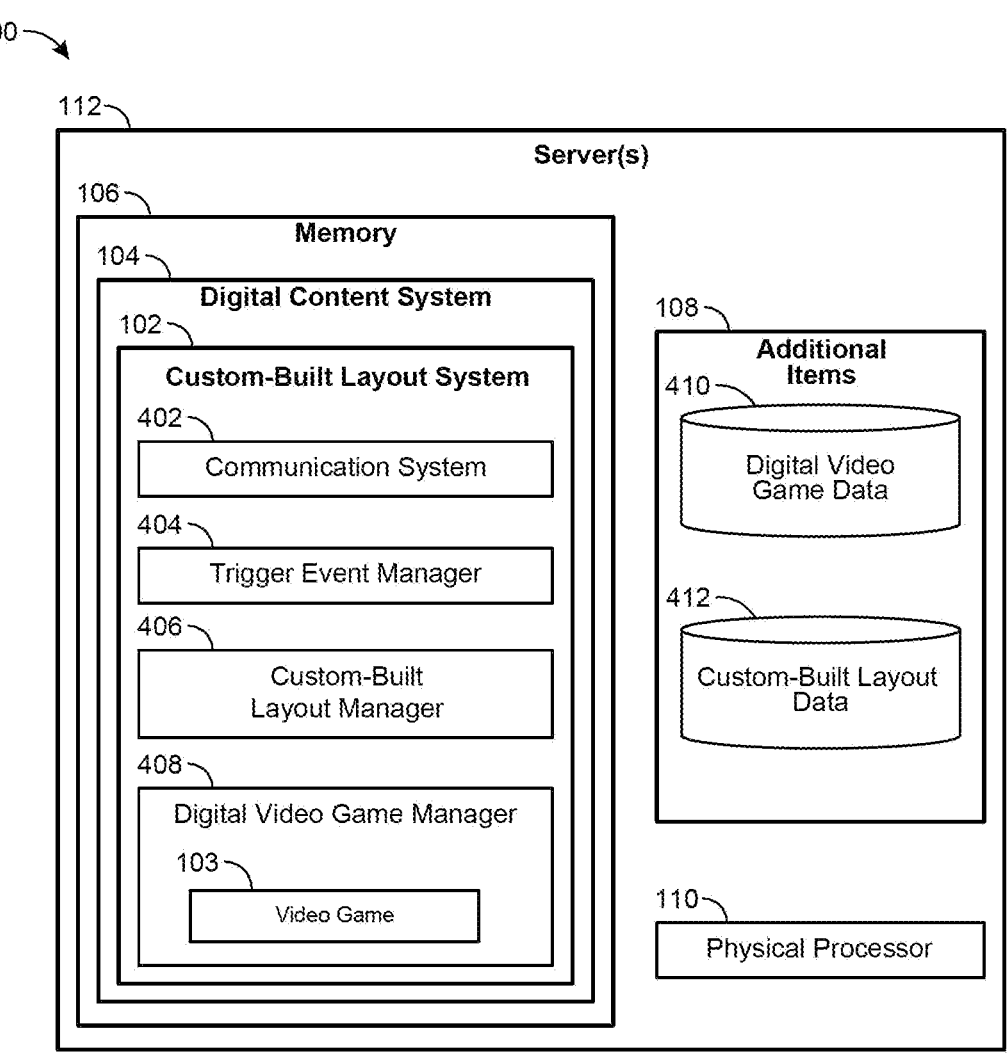
FIG. 4 is a detailed diagram of the custom-built layout system in accordance with one or more implementations.

The following will provide, with reference to FIGS. 1-4, detailed descriptions of a custom-built layout system that generates and causes custom-built layouts to be displayed on a second screen device during video gameplay. For example, an exemplary network environment is illustrated in FIG. 1 to show the custom-built layout system operating in connection with a first screen device and a second screen device. FIG. 2 illustrates steps taken by the custom-built layout system to generate custom-built layouts for display on the second screen device in connection with a video game. FIGS. 3A-3M illustrate custom-built layouts generated by the custom-built control system. Finally, FIG. 4 provides additional detail with regard to the features and functionality of the custom-built layout system.

As just mentioned, FIG. 1 illustrates an exemplary networking environment 100 implementing aspects of the present disclosure. For example, the networking environment 100 includes server(s) 112, a first screen device 114, a second screen device 116, and a network 120. As further shown, the server(s) 112, the first screen device 114, and the second screen device 116 include a memory 106, additional items 108, and a physical processor 110.

In one or more implementations, as shown in FIG. 1, the first screen device 114 is a television and the second screen device 116 is a smartphone. In some examples, the entire display of the second screen device 116 serves a video game 103 streamed to and displayed on the first screen device 114. In many examples, the display of the second screen device 116 operates as a video game controller relative to the video game 103 as well as operating as a true second screen device—where a user interacts with video game information only shown on the second screen device 116 and not on the first screen device 114. In some implementations, the first screen device 114 and the second screen device 116 are on the same subnet (e.g., within the same residence or location). In additional implementations, the first screen device 114 and the second screen device 116 are on subnets. In yet additional implementations, the first screen device 114 includes at least one of a digital projector, a monitor, or other display device. Similarly, in additional implementations, the second screen device 116 includes a tablet computer or a smart wearable device with an interactive display screen.

As further shown in FIG. 1, a custom-built layout system 102 is implemented as part of a digital content system 104 within the memory 106 on the server(s) 112. In one or more implementations, the digital content system 104 includes a subscription streaming service for providing digital media content subscribers. Additionally, the custom-built layout system 102 accesses the video game 103, runs the video game 103, streams output from the video game 103 to one or both of the first screen device 114 and the second screen device 116 (e.g., to cause the first screen device 114 to render game graphics, to cause the second screen device 116 to display layouts), and receives inputs from a video game controller (e.g., such as the second screen device 116), etc. In one or more implementations, the custom-built layout system 102 works in concert with the video game 103 to analyze inputs, change game states, detect trigger events associated with custom-built layouts, and generate instructions for displaying custom-built layouts for display and use on the second screen device 116.

As further shown in FIG. 1, the first screen device 114 and the second screen device 116 include a digital content system application 118 within the memory 106 thereon. In some implementations, the digital content system application 118 includes some or all of the functionality of the custom-built layout system 102 such that the custom-build layout system 102 on the second screen device 116 communicates information to and from the digital content system 104 via the network 120. In at least one implementation, the custom-built layout system 102 on the server(s) 112—in concert with the video game 103—accesses and utilizes data received by the digital content system 104 in generating and providing custom-built layouts during video gameplay. To illustrate, in one implementation, the first screen device 114 receives video game display information from the digital content system 104 (e.g., in connection with the video game 103). The second screen device 116 further communicates directly with the server(s) 112 via the custom-built layout system 102 within the digital content system application 118 installed thereon. As such, in most examples, the custom-built layout system 102 provides a communication channel and corresponding protocols between the second screen device 116 and the digital content system 104 on the server(s) 112.

As mentioned above, the first screen device 114 and/or the second screen device 116 is communicatively coupled with the server(s) 112 through the network 120. In one or more implementations, the network 120 represents any type or form of communication network, such as the Internet, and includes one or more physical connections, such as a LAN, and/or wireless connections, such as a WAN. In some implementations, the network 120 represents a telecommunications carrier network. In at least one implementation, the network 120 represents combinations of networks such that the first screen device 114 communicates with the custom-built layout system 102 via a wireless network while the second screen device 116 communicates with the custom-built layout system 102 via a cellular network.

Although FIG. 1 illustrates components of the exemplary networking environment 100 in one arrangement, other arrangements are possible. For example, in one implementation, the custom-built layout system 102 operates as a native application installed on the first screen device 114 and/or the second screen device 116. In another implementation, the custom-built layout system 102 operates across multiple servers. Moreover, in some implementations, the exemplary networking environment 100 includes multiple second screen devices 116—such as when a multiplayer game is being played on one or more first screen devices 114 across one or more households. Similarly, in some examples, the exemplary networking environment 100 also includes multiple first screen devices 114 such as when multiple players are playing a video game on separate displays. For example, in that implementation, the custom-built layout system 102 supports the same video game being played by multiple players (e.g., on multiple second screen devices and multiple first screen devices) across multiple locations and on different user accounts within the digital content system 104.

In one or more implementations, and as will be explained in greater detail below, the methods and steps performed by the custom-built layout system 102 reference multiple terms. To illustrate, in one example, a "digital video game" refers to a digital program that causes game graphics to be rendered on a display device, such as a first screen device, as user inputs received via a second screen device manipulate or interact with the rendered game graphics. A video game typically includes points, places, junctures, levels, characters, and other displayed objects. Moreover, in most video games, objects, characters, and so forth are interactive and/or customizable.

As used herein, a "standard layout" or "custom-built layout" refers to a specific arrangement of displayed elements such as video game controls, interactive elements, and other displayed information. For example, a second screen device displays a standard layout that includes one or more video game controls that are a predetermined size and positioned in a predetermined location within the layout in order to emulate a physical video game controller. Conversely, a custom-build control layout includes a customized layout of customized interactive and non-interactive elements that provide unique second screen device functionality (e.g., functionality that cannot be achieved by a standard layout). A "video game control" generally refers to an interactive graphic within a layout that is interacted with in specific ways and that is mapped to particular functions relative to the video game. Similarly, an interactive element generally refers to an interactive graphic within a custom-built layout that is mapped to particular functions relative to the video game that are shown in the general video game display on the first screen device 114, on the display of the second screen device 116, or on both the first screen device 114 and the second screen device 116.

As used herein, "rich user interactions" refer to types of user interactions that are detected in connection with video game controls displayed within a custom-built layout on a second screen device. In one or more examples, rich user interactions include swipe touch gestures on the second screen device, zoom touch gestures on the second screen device, drag-and-drop touch gestures on the second screen device, pan touch gestures on the second screen device, displayed object rotation touch gestures on the second screen device, gyroscopic interactions using the second screen device (e.g., the second screen device being tilted, rotated, tipped, etc.), and/or microphone interactions using the second screen device.

As used herein, "hidden information gameplay" refers to a type of asymmetric gameplay among a group of players engaged with the same instance of a video game. In one or more examples, hidden information gameplay includes video game controls, layouts, graphics, and/or video game information that is displayed on the second screen device of one or more of the group of players—but not all of the players' second screen device or the first screen device. In one illustrative example, hidden information gameplay enables one player in a group to play a mini-game or puzzle on their second screen device while the rest of the group of players are engaged in main video gameplay. In another illustrative example, hidden information gameplay enables cooperative gameplay where each player in a group receives segmented information that is displayed on each player's second screen device and players must collaborate to solve a puzzle, unlock a room, build a structure, etc.

As used herein, a "trigger event" refers to an event relative to a video game that necessitates a change in a layout on a second screen device. In some examples, trigger events are based on an event specific to the video game, such as achieving a particular level, encountering a particular non-player character, interacting with a particular object, etc. In additional instances, a trigger event is user-initiated and is detected in response to a specific user interaction with one or more controls within a standard layout. To illustrate, in one example, a standard layout on the second screen device 116 includes one or more video game controls that, when interacted with, cause a trigger event that leads to a change in control layout. In some implementations, a trigger event causes the custom-built layout system 102 to replace a standard layout with a custom-built layout. In additional implementations, a trigger event causes the custom-built layout system 102 to replace a custom-built layout with a standard layout.

As mentioned above, FIG. 2 is a flow diagram of an exemplary computer-implemented method 200 for causing the second screen controller to replace a standard layout with a custom-built layout in response to a detected trigger event. The steps shown in FIG. 2 may be performed by any suitable computer-executable code and/or computing system, including the system(s) illustrated in FIG. 4. In one example, each of the steps shown in FIG. 2 may represent an algorithm whose structure includes and/or is represented by multiple sub-steps, examples of which will be provided in greater detail below.

As illustrated in FIG. 2, at step 202 the custom-built layout system 102, in response to a detected selection of a video game via a first screen device, converts a second screen device to a video game controller featuring a standard layout on a display of the second screen device. In some examples, the custom-built layout system 102 converts the second screen device 116 to a video game controller in response to initialization of the video game 103. In additional examples, the custom-built layout system 102 converts the second screen device 116 to a video game controller in response to a detected user selection indicating that the user wants to use the second screen device 116 as a video game controller. In some implementations, a standard layout emulates a physical video game controller with standard video game controls in standard positions within the display. Additionally, in some implementations, a custom-built layout provides unique second screen device controller functionality such as rich user interactions and/or hidden information gameplay.

As further illustrated in FIG. 2, at step 204 the custom-built layout system 102 detects a trigger event associated with the video game that necessitates a layout change for the second screen device. In some examples, the custom-built layout system 102 detects trigger events that are user-initiated and/or video game context-initiated. One example of a user-initiated trigger event includes the user of the second screen device 116 selecting a particular video game control within a standard layout. One example of a video game context-initiated trigger event includes gameplay of the video game 103 reaching a predetermined point (e.g., reaching a particular level, obstacle, challenge).

As further illustrated in FIG. 2, at step 206 the custom-built layout system 102 determines a custom-built layout that corresponds to the trigger event. In one or more examples, the custom-built layout system 102 determines a custom-built layout that corresponds to the trigger event based on the video game 103. In that example, the video game 103 includes instructions, heuristics, models, etc. that indicate a custom-built layout for the detected trigger event. In at least one example, the custom-built layout system 102 identifies the custom-built layout as a web page hosted by the digital content system 104.

As further illustrated in FIG. 2, at step 208 the custom-built layout system 102 transmits, to the second screen device, one or more instructions for displaying the custom-built layout that causes the second screen device to replace the standard layout with the custom-built layout. In one or more examples, the custom-built layout system 102 generates and transmits the instruction for displaying the custom-built layout as web-based instructions (e.g., hyper-text markup language) from a web server hosted by the digital content system 104.

As mentioned above, the custom-built layout system 102 converts a user's smartphone (e.g., the second screen device 116) to a video game controller for use in connection with the video game 103. The custom-built layout system 102 further generates and causes the second screen device 116 to display custom-built layouts in connection with gameplay of the video game 103. FIGS. 3A-30 illustrate how the custom-built layout system 102 causes the second screen device 116 to display and utilize a variety of custom-built layouts.

For example, as shown in FIG. 3A, the custom-built layout system 102 generates a conversion graphical user interface 302 on the first screen device 114. In one or more implementations, the custom-built layout system 102 generates the conversion graphical user interface 302 including a quick-response code 304 and a device confirmation area 306. In at least one implementation, the digital content system application 118 on the second screen device 116 displays a corresponding conversion graphical user interface 308 on a display of the second screen device 116. The user of the second screen device 116 points a camera of the second screen device 116 at the quick-response code 304 via a viewfinder window 310 on the second screen device 116. In at least one implementation, the custom-built layout system 102 converts the second screen device 116 to a video game controller in response to determining that the second screen device 116 has scanned the same quick-response code 304 being displayed by the first screen device 114. Upon making this determination, the custom-built layout system 102 updates the device confirmation area 306 to show that the second screen device 116 is connected to the digital content system 104 as a video game controller.

In one or more implementations, the custom-built layout system 102 causes the second screen device 116 to display both standard layouts and custom-built layouts. To illustrate, FIG. 3B shows a standard layout 311 on a display of the second screen device 116. In the example shown in FIG. 3B, the second screen device 116 (e.g., via the digital content system application 118 thereon) generates and displays the standard layout 311 based on instructions that are part of the video game 103 as translated by the custom-built layout system 102. In one or more implementations, the standard layout 311 includes both system controls 314a, 314b, and 314c, as well as video game controls 316a, 316b, and 316c.

In most examples, the system controls 314a-314c are tied to functions of the digital content system 104 and/or custom-built layout system 102. For example, in response to a detected selection of the system control 314a, the custom-built layout system 102 converts the second screen device 116 from a video game controller back to the standard functionality of the digital content system application 118 installed thereon. In response to a detected selection of the system control 314b, the custom-built layout system 102 overlays a menu of functions related to the digital content system 104. In response to a detected selection of the system control 314c, the custom-built layout system 102 overlays a menu related to the video game 103.

In most examples, the video game controls 316a-316c are programmatically associated with functions within the video game 103. For example, in response to a detected touch gesture interaction with the video game control 316a (e.g., a joystick control), the video game 103 causes a video game character to move within an environment displayed by the first screen device 114. Moreover, in response to a detected selection of the video game controls 316b, 316c, the video game 103 causes the video game character to jump and attack, respectively.

In one or more implementations, the custom-built layout system 102 replaces the standard layout 311 with a custom-built layout in response to one or more trigger events. In some examples, a trigger event is initiated by the user of the second screen device 116 or by a context of the video game. In more detail, a user-initiated trigger event includes the user selecting a control (e.g., a system control or a video game control) from the standard layout 311. Other user-initiated trigger events can include a voice input from the user (e.g., as detected by a microphone of the second screen device 116) or a gyroscopic input from the user of the second screen device 116 (e.g., the user tilts the second screen device 116 in a predetermined direction). A video game context-initiated trigger event including gameplay reaching a predetermined point. To illustrate, gameplay of the video game 103 may reach a predetermined level or may reach an interaction with a specific character. While many examples discussed herein include the custom-built layout system 102 replacing a standard layout with a custom-built layout in response to a trigger event (and vice versa), it will be understood that in some examples, custom-built layouts are exclusively utilized by the video game 103 to accomplish gameplay. In such examples, the custom-built layout system 102 causes only custom-built layouts to be displayed by the second screen device 116.

Returning to FIG. 3B, in response to detecting a trigger event associated with the video game 103 (i.e., either user-initiated or video game context-initiated), the custom-built layout system 102 determines a custom-built layout that corresponds to the trigger event and transmits instructions that cause the second screen device 116 to replace the standard layout 311 with that custom-built layout. To illustrate, FIG. 3C shows how the custom-built layout system 102 causes the second screen device 116 to display the custom-built layout 312 including custom elements such as the interactive element 317a. In response to a detected selection of the interactive element 317a, the custom-built layout system 102 updates the custom-built layout 312 to include additional interactive elements 317b and 317c, as shown in an example in FIG. 3D. In the example shown, the interactive elements 317a-317c are associated with radio frequency tuning capabilities within the video game 103.

As further demonstrated by the interactive elements 317d and 317e shown in an example in FIG. 3E, the custom-built layout system 102 causes the second screen device 116 to display the custom-built layout 312 including interactive elements with custom shapes, colors, images, and so forth. For example, in response to a detected selection of the interactive elements 317d and/or 317e, the custom-built layout system 102 updates the custom-built layout 312 to display a collection of potions and/or spells amassed during gameplay by the user of the second screen device 116. As further shown in the example in FIG. 3E, the custom-built layout system 102 sometimes causes the second screen device 116 to display additional system controls such as the system control 314d. In response to a detected selection of the system control 314d, the custom-built layout system 102 overlays a menu of additional system functions.

As further shown in an example in FIG. 3F, the custom-built layout system 102 causes the second screen device 116 to display the custom-built layout 312 with the interactive elements 317f, 317g, 317h, and 317i including a non-standard size, shape, and color. Moreover, the custom-built layout 312 shown in the example in FIG. 3F features a portrait orientation rather than a landscape orientation. Regardless of the contents and/or orientation of the custom-built layout 312, the custom-built layout system 102 causes the second screen device 116 to display the system controls 314a-314c as part of any custom-built layout. In one or more implementations, the custom-built layout system 102 causes the system controls 314a-314c to be displayed as part of both standard layouts and custom-built layouts to provide a consistent look and feel to all layouts.

In additional implementations, the custom-built layout system 102 causes the second screen device 116 to display custom-built layouts featuring increased levels of complexity. To demonstrate, in an example shown in FIG. 3G, the custom-built layout system 102 causes the second screen device 116 to display the custom-built layout 312 including complex graphics and scrolling text. In another example shown in FIG. 3H, the custom-built layout system 102 causes the second screen device 116 to display the custom-built layout 312 including a complex layout of custom interactive elements, text, and other graphics. In additional implementations, the custom-built layout system 102 causes the second screen device 116 to display custom-built layouts 312 including mini-games (e.g., a puzzle that needs to be put together on the second screen device 116 in order to advance gameplay displayed by the first screen device 114), side quests, and other types of gameplay outside of the main gameplay shown on the first screen device 114.

In additional implementations, the custom-built layout system 102 causes the second screen device 116 to display custom-built layouts with text input capabilities. To illustrate, as shown in an example in FIGS. 3I and 3J, the custom-built layout system 102 causes the second screen device 116 to display the custom-built layout 312 including a text prompt inviting the user of the second screen device 116 to enter a question. In response to a detected selection of the interactive element 317*j*, the custom-built layout system 102 updates the custom-built layout 312 to include a standard keyboard display 318, as shown in FIG. 3L. In response to detected selections of keys within the keyboard display 318, the custom-built layout system 102 continuously updates the custom-built layout 312 to reflect the user's inputs. In this example, the custom-built layout system 102 on the second screen device 116 communicates the user's text inputs to the video game 103 for additional gameplay.

Moreover, in some implementations, the custom-built layout system 102 causes the second screen device 116 to display custom-built layouts that include standard video game controls in addition to customized elements. To illustrate, in an example in FIG. 3K, the custom-built layout system 102 causes the second screen device 116 to display standard video game controls 316*d*, 316*e*, 316*f*, 316*g*, 316*h*, and 316*i* overlayed on a customized background within the custom-built layout 312. In this way, video game developers can give standard video game controls the same look and feel as the video game 103 without having to reconfigure the functionality of the standard video game controls.

In one or more implementations, the custom-built layout system 102 overlays custom or standard messaging on a custom-built layout. For example, as shown in an example in FIG. 3L, the custom-built layout system 102 overlays a connection update message on the custom-built layout 312 to inform the user of the second screen device 116 that the connection between the second screen device 116 and the video game 103 has been lost.

As mentioned above, the custom-built layout system 102 replaces a standard layout with a custom-built layout in response to a detected trigger event. In one or more examples, the custom-built layout system 102 further replaces the custom-built layout with a standard layout in response to an additional trigger event. In one example, the custom-built layout 312 replaces the custom-built layout 312 with a standard layout in response to a detected selection of the system control 314*a*. As shown in FIG. 3M, in response to a detected selection of the system control 314*a*, the custom-built layout system 102 replaces the custom-built layout 312 with the confirmation graphical user interface 322. As further shown in FIG. 30, the custom-built layout system 102 generates the confirmation graphical user interface 322 including a message informing the user of the second screen device 116 that the video game controller will close. The custom-built layout system 102 further generates the confirmation graphical user interface 322 with a close button 324*a* and a cancel button 324*b*. In response to a detected selection of the close button 324*a*, the custom-built layout system 102 replaces the confirmation graphical user interface 322 with a digital content system application graphical user interface. In response to a detected selection of the cancel button 324*b*, the custom-built layout system 102 replaces the confirmation graphical user interface 322 with a previous custom-built layout 312.

As mentioned above, and as shown in FIG. 4, the custom-built layout system 102 performs various functions in connection with causing the second screen device 116 to display custom-built layouts. FIG. 4 is a block diagram 400 of the custom-built layout system 102 operating within the memory 106 of the server(s) 112 while performing these functions. As such, FIG. 4 provides additional detail with regard to these functions. For example, in one or more implementations as shown in FIG. 4, the custom-built layout system 102 includes a communication system 402, a trigger event manager 404, a custom-built layout manager 406, and a digital video game manager 408 associated with the video game 103. As further shown in FIG. 4, the additional items 108 stores and maintains digital video game data 410 and custom-built layout data 412.

In certain implementations, the custom-built layout system 102 represents one or more software applications, modules, or programs that, when executed by a computing device, may cause the computing device to perform one or more tasks. For example, and as will be described in greater detail below, one or more of the communication system 402, the trigger event manager 404, the custom-built layout manager 406, or the digital video game manager 408 may represent software stored and configured to run on one or more computing devices, such as the server(s) 112. One or more of the communication system 402, the trigger event manager 404, the custom-built layout manager 406, and the digital video game manager 408 of the custom-built layout system 102 shown in FIG. 4 may also represent all or portions of one or more special purpose computers to perform one or more tasks.

As mentioned above, and as shown in FIG. 4, the custom-built layout system 102 includes the communication system 402. In one or more implementations, the communication system 402 sends and/or receives game data to and/or from one or more first screen devices and/or one or more second screen devices. For example, as discussed above, the communication system 402 receives and/or detects gameplay data such as a current video game level being played, objects currently displayed during gameplay, characters currently being encountered, a video game score, and so forth.

In one or more examples, the communication system 402 further receives and/or detects control inputs from a second screen device. For example, the communication system 402 receives and/or detects rich user interactions such as, but not limited to, swipe touch gestures on the second screen device, zoom touch gestures on the second screen device, drag-and-drop touch gestures on the second screen device, pan touch gestures on the second screen device, displayed object rotation touch gestures on the second screen device, gyroscopic interactions using the second screen device, or microphone interactions using the second screen device. In one or more implementations, the communication system 402 receives and/or detects such control inputs relative to specific video game controls within a control layout currently displayed by a second screen device (e.g., a standard layout or a custom-built layout). Additionally, the communication system 402 receives and/or detects timing information associated with the control inputs that indicates how quickly video game controls are selected, a sequence in which video game controls are selected, and so forth.

In one or more implementations, the communication system 402 sends, transmits, or provides instructions for displaying custom-built layout to second screen devices. In at least one implementation, the communication system 402 hosts one or more web servers that generate instructions for displaying a web page to the second screen device 116. As such, in some implementations a custom-built layout is hyper-text markup language based (HTML based). In those implementations, the communication system 402 causes a web server that hosts a particular custom-built layout to generate HTML based instructions for displaying that custom-built layout. The communication system 402 then causes the web server to transmit those instructions to the second screen device 116. The custom-built layout system 102 operating as part of the digital content system application 118 on the second screen device 116 then assembles the custom-built layout on the display of the second screen device 116 according to the received instructions.

As mentioned above, and as shown in FIG. 4, custom-built layout system 102 includes the trigger event manager 404. In one or more implementations, the trigger event manager 404 analyzes video gameplay data and/or inputs from the second screen device 116 to detect trigger events associated with the video game 103. For example, the trigger event manager 404 detects both user-initiated trigger events and video game context-initiated trigger events. For example, the trigger event manager 404 detects user-initiated trigger events including user selections of predetermined controls within a standard layout. To demonstrate, the trigger event manager 404 accesses definitions and/or heuristics from the video game 103 indicating that a particular control within a standard layout triggers a layout change, rather than a typical video game function (e.g., causing a video game character to move, jump, attack, etc.). Thus, in response to a detected selection of that control, the trigger event manager 404 detects a trigger event.

The trigger event manager 404 also detects video game context-initiated trigger events. To illustrate, in some examples, the trigger event manager 404 detects a trigger event when a particular character, item, level, etc. is encountered within a video game. In additional examples, the trigger event manager 404 detects a trigger event when a particular video game control or sequence of video game controls is selected. Additionally, the trigger event manager 404 analyzes selected video game controls in view of the gameplay data associated with the video game 103. In some examples, the trigger event manager 404 detects a trigger event in response to detecting the selection of one or more video game controls at a particular point or level within the video game 103 (e.g., indicated by the gameplay data). The trigger event manager 404 performs this analysis in connection with one or more of decision trees, point clouds, databases, video game specified rules, and/or machine learning models.

In response to detecting a trigger event, the trigger event manager 404 determines a custom-built layout that corresponds to the trigger event. To illustrate, in some implementations, the video game 103 specifies that once gameplay reaches a particular level a trigger event has occurred that necessitates a layout change for the second screen device 116. The video game 103 then further indicates a custom-built layout associated with the particular level. In some implementations, the video game 103 indicates the custom-built layout as an identifier corresponding to a web address for a web server hosted by the communication system 402 as discussed above.

In at least one implementation, the trigger event manager 404 utilizes various artificial intelligence techniques to detect trigger events. To illustrate, in some examples, the trigger event manager 404 generates a machine learning model input based on the received gameplay data and video game control inputs. In those examples, the trigger event manager 404 further applies a machine learning model to the generated input to generate a trigger event prediction. For example, the trigger event manager 404 trains the machine learning model to generate trigger event predictions by applying the machine learning model to training inputs, and then back-propagating generated training predictions over multiple training cycles until the accuracy of the training predictions converges.

As mentioned above, and as shown in FIG. 4, the custom-built layout system 102 includes the custom-built layout manager 406. In one or more implementations, the custom-built layout manager 406 generates and maintains a communication channel between the second screen device 116 and the server(s) 112 to facilitate gameplay via a custom-built layout. For example, as shown in FIG. 1, the custom-built layout system 102 is part of the second screen device 116 in addition to being part of the digital content system 104 on the server(s) 112. In at least one implementation, a custom-built layout is a web application (e.g., implemented with web technologies such as HTML, Javascript, etc.). As such, once the second screen device 116 displays a custom-built layout, the custom-built layout manager 406 communicates gameplay data from the custom-built layout on the second screen device 116 to video game 103 on the server(s) 112 (e.g., using a software development kit or similar).

In additional implementations, the custom-built layout manager 406 generates and maintains communication channels between more than one second screen device—such as with group gameplay across multiple locations and/or digital content system accounts—and a single instance of the video game 103. In such implementations, the custom-built layout manager 406 manages asymmetric gameplay with custom-built layouts. To illustrate, in a multiplayer game session, the custom-built layout manager 406 tracks a gameplay state for each player (e.g., each second screen device) engaged with a single instance of the video game 103.

By tracking gameplay states, the custom-built layout manager 406 further manages hidden information gameplay for each of the players. For example, the custom-built layout manager 406 utilizes custom-built layouts to display information to a subset of the total number of players currently engaged with a single instance of the video game 103. To illustrate, in one example the video game 103 is a questing video game. In this example, when one player in a group of players discovers a hidden passage, the custom-built layout manager 406 updates the custom-built layout on the second screen device of that player to display a mini puzzle that the player must solve in order to earn an upgraded weapon or spell. In this example, the custom-built layout manager 406 updates the custom-build control layout on only one second screen device out of a group of second screen devices that are all engaged with the same instance of the video game 103. In this way, the custom-built layout manager 406 enables asymmetric gameplay that includes individual mini-games, player-to-player messaging, and many other types of gameplay.

In one or more implementations, the custom-built layout manager 406 also enables the authoring, testing, and deployment of custom-built layouts. For example, the custom-built layout manager 406 includes one or more of: design suites, software development kits, libraries, hosting services, simulators, and so forth that are accessible by video game developers in connection with custom-built layouts. To illustrate, a game developer may utilize any of these custom-built layout tools to design, build, and test a custom-built layout in connection with a video game. In at least one implementation, the custom-built layout manager 406 enables the custom-built layout information or code to be packaged with the video game such that the custom-built layout is deployed as part of the video game with no additional work required of the developer. For example, the custom-built layout manager 406 packages the custom-built layout information with the video game such that—as part of the deployment pipeline of the video game—the custom-built layout information is extracted from the package and automatically hosted by the custom-built layout system 102. Moreover, as mentioned above, the custom-built layout manager 406 can host (e.g., as part of a web server) HTML code representing a custom-built layout. In that implementation, the custom-built layout manager 406 enables the web address of the web server to be embedded in the video game code, while also hosting the corresponding HTML code. As such, the developer need only design the custom-built layout while the custom-built layout manager 406 handles embedding the correct web address into the video game code, hosting the HTML for the custom-built layout, and establishing and monitoring communication channels once the custom-built layout is displayed on a second screen device.

As mentioned above, and as shown in FIG. 4, the custom-built layout system 102 includes the digital video game manager 408. In one or more implementations, the digital video game manager 408 loads or initiates a selected video game. For example, in response to a user selection of the video game 103, the digital video game manager 408 loads the video game 103 by causing the first screen device 114 to render video game graphics. Additionally, the digital video game manager 408 causes the second screen device 116 to display an initial video game control layout. For example, the digital video game manager 408 converts the second screen device 116 into a video game controller as part of initiating the video game 103. In at least one example, the digital video game manager 408 does this by replacing a current display on the second screen device 116 with an initial video game control layout. In some implementations, the initial video game control layout is a standard layout. In additional implementations, the initial video game control layout is a custom-built layout.

As shown in FIGS. 1 and 4, the server(s) 112, the first screen device 114, and the second screen device 116 include one or more physical processors, such as the physical processor 110. The physical processor 110 on each of the server(s) 112, the first screen device 114, and the second screen device 116 generally represent any type or form of hardware-implemented processing unit capable of interpreting and/or executing computer-readable instructions. In one implementation, the physical processor 110 accesses and/or modifies one or more of the components of the custom-built layout system 102. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

Additionally, the server(s) 112, the first screen device 114, and the second screen device 116 include the memory 106. In one or more implementations, the memory 106 on each of the server(s) 112, the first screen device 114, and the second screen device 116 generally represents any type or form of volatile or non-volatile storage device or medium capable of storing data and/or computer-readable instructions. In one example, the memory 106 stores, loads, and/or maintains one or more of the components of the custom-built layout system 102. Examples of the memory 106 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

Moreover, as shown in FIG. 4, the server(s) 112, the first screen device 114, and the second screen device 116 include the additional items 108. On the server(s) 112, the additional items 108 include the digital video game data 410 and custom-built layout data 412. In one or more implementations, the digital video game data 410 includes digital video games. The digital video game data 410 further includes machine learning models for specific digital video games that predict whether a trigger event has occurred. In some implementations, the digital video game data 410 also includes algorithms, tables, databases, decision trees, point clouds, etc. for use in detecting trigger events and determining custom-built layouts that correspond to detected trigger events. Additionally, custom-built layout data 412 includes custom-built layout information and instructions (e.g., including HTML script, JavaScript, etc.) custom-built layouts associated with digital video games supported by the digital content system 104.

In summary, the custom-built layout system 102 hosts and otherwise supports custom-built layouts in connection with video games played with the digital content system 104. As discussed above, the custom-built layout system 102 replaces standard layouts with custom-built layouts on the display of the second screen device 116. In some instances, the custom-built layout system 102 makes these replacements in response to detecting various types of trigger events. As illustrated through FIGS. 3C-3M, the custom-built layout system 102 generates and displays custom-built layouts that are highly customizable and that enable rich user interactions and asymmetric gameplay. As such, the custom-built layout system 102 enables the creation of digital video games that are intuitive to play while being extremely immersive and dynamic.

Example Embodiments

Example 1: A computer-implemented method for causing a second screen device to display a custom-built layout while the second screen device is converted to a video game controller. For example, the method may include, in response to a detected selection of a video game via a first screen device, converting a second screen device to a video game controller featuring a standard layout on a display of the second screen device, detecting a trigger event associated with the video game that necessitates a layout change for the second screen device, determining a custom-built layout that corresponds to the trigger event, and transmitting, to the second screen device, one or more instructions for displaying the custom-built layout that causes the second screen device to replace the standard layout with the custom-built layout.

Example 2: The computer-implemented method of Example 1, wherein the standard layout emulates a physical video game controller and the custom-built layout provides unique second screen device controller functionality including one or more of rich user interactions or hidden information gameplay.

Example 3: The computer-implemented method of any of Examples 1 and 2, wherein the rich user interactions include one or more of swipe touch gestures on the second screen device, zoom touch gestures on the second screen device, drag-and-drop touch gestures on the second screen device, pan touch gestures on the second screen device, displayed object rotation touch gestures on the second screen device, gyroscopic interactions using the second screen device, or microphone interactions using the second screen device.

Example 4: The computer-implemented method of any of Examples 1-3, wherein the hidden information gameplay includes video game information that is displayed only on the second screen device and not on the first screen device or any other device being used as a video game controller relative to the video game.

Example 5: The computer-implemented method of any of Examples 1-4, wherein detecting the trigger event includes detecting one of a user-initiated trigger event or a video game context-initiated trigger event.

Example 6: The computer-implemented method of any of Examples 1-5, wherein detecting a user-initiated trigger event includes one or more of detecting a user selection of one or more controls within the standard layout.

Example 7: The computer-implemented method of any of Examples 1-6, wherein detecting video game context-initiated trigger events includes detecting that current gameplay of the video game has reached a predetermined point.

Example 8: The computer-implemented method of any of Examples 1-7, further including detecting an additional trigger event associated with the video game, and in response to the additional trigger event, causing the display of the second screen device to return to the standard layout.

In some examples, a system may include at least one processor and a physical memory including computer-executable instructions that, when executed by the at least one processor, cause the at least one processor to perform various acts. For example, the computer-executable instructions may cause the at least one processor to perform acts including, in response to a detected selection of a video game via a first screen device, converting a second screen device to a video game controller featuring a standard layout on a display of the second screen device, detecting a trigger event associated with the video game that necessitates a layout change for the second screen device, determining a custom-built layout that corresponds to the trigger event, and transmitting, to the second screen device, one or more instructions for displaying the custom-built layout that causes the second screen device to replace the standard layout with the custom-built layout.

In some examples, a method may be encoded as computer-readable instructions on a computer-readable medium. In one example, the computer-readable instructions, when executed by at least one processor of a computing device, cause the computing device to, in response to a detected selection of a video game via a first screen device, converting a second screen device to a video game controller featuring a standard layout on a display of the second screen device, detecting a trigger event associated with the video game that necessitates a layout change for the second screen device, determining a custom-built layout that corresponds to the trigger event, and transmitting, to the second screen device, one or more instructions for displaying the custom-built layout that causes the second screen device to replace the standard layout with the custom-built layout.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:
in response to a detected selection of a video game via a first screen device, converting a second screen device to a video game controller featuring a standard layout on a display of the second screen device, wherein the standard layout emulates a physical video game controller;
detecting a trigger event associated with the video game that necessitates a layout change for the second screen device;
determining a custom-built layout that corresponds to the trigger event, wherein the custom-built layout enables a functionality not in the standard layout and differs from the standard layout of at least one other second screen device of a different user of an instance of the video game; and
transmitting, to the second screen device, one or more instructions for displaying the custom-built layout that causes the second screen device to replace the standard layout with the custom-built layout.

2. The computer-implemented method of claim 1, wherein:
the standard layout emulates a physical video game controller, and
the custom-built layout provides unique second screen device controller functionality comprising one or more of rich user interactions or hidden information gameplay.

3. The computer-implemented method of claim 2, wherein the rich user interactions comprise one or more of swipe touch gestures on the second screen device, zoom touch gestures on the second screen device, drag-and-drop touch gestures on the second screen device, pan touch gestures on the second screen device, displayed object rotation touch gestures on the second screen device, gyroscopic interactions using the second screen device, or microphone interactions using the second screen device.

4. The computer-implemented method of claim 2, wherein the hidden information gameplay comprises video game information that is displayed only on the second screen device and not on the first screen device or any other device being used as a video game controller relative to the video game.

5. The computer-implemented method of claim 1, wherein detecting the trigger event comprises detecting one of a user-initiated trigger event or a video game context-initiated trigger event.

6. The computer-implemented method of claim 5, wherein detecting a user-initiated trigger event comprises one or more of detecting a user selection of one or more controls within the standard layout.

7. The computer-implemented method of claim 5, wherein detecting a video game context-initiated trigger event comprises detecting that current gameplay of the video game has reached a predetermined point.

8. The computer-implemented method of claim 1, further comprising:
detecting an additional trigger event associated with the video game; and
in response to the additional trigger event, causing the display of the second screen device to return to the standard layout.

9. A system comprising:
at least one physical processor; and
physical memory comprising computer-executable instructions that, when executed by the at least one physical processor, cause the at least one physical processor to perform acts comprising:
in response to a detected selection of a video game via a first screen device, converting a second screen device to a video game controller featuring a standard layout on a display of the second screen device, wherein the standard layout emulates a physical video game controller;

detecting a trigger event associated with the video game that necessitates a layout change for the second screen device;

determining a custom-built layout that corresponds to the trigger event, wherein the custom-built layout enables a functionality not in the standard layout and differs from the standard layout of at least one other second screen device of a different user of an instance of the video game; and transmitting, to the second screen device, one or more instructions for displaying the custom-built layout that causes the second screen device to replace the standard layout with the custom-built layout.

10. The system of claim 9, wherein:

the standard layout emulates a physical video game controller, and the custom-built layout provides unique second screen device controller functionality comprising one or more of rich user interactions or hidden information gameplay.

11. The system of claim 10, wherein the rich user interactions comprise one or more of swipe touch gestures on the second screen device, zoom touch gestures on the second screen device, drag-and-drop touch gestures on the second screen device, pan touch gestures on the second screen device, displayed object rotation touch gestures on the second screen device, gyroscopic interactions using the second screen device, or microphone interactions using the second screen device.

12. The system of claim 10, wherein the hidden information gameplay comprises video game information that is displayed only on the second screen device and not on the first screen device or any other device being used as a video game controller relative to the video game.

13. The system of claim 9, wherein detecting the trigger event comprises detecting one of a user-initiated trigger event or a video game context-initiated trigger event.

14. The system of claim 13, wherein detecting a user-initiated trigger event comprises one or more of detecting a user selection of one or more controls within the standard layout.

15. The system of claim 13, wherein detecting a video game context-initiated trigger event comprises detecting that current gameplay of the video game has reached a predetermined point.

16. The system of claim 9, further comprising computer-executable instructions that, when executed by the at least one physical processor, cause the at least one physical processor to perform acts comprising:

detecting an additional trigger event associated with the video game; and in response to the additional trigger event, causing the display of the second screen device to return to the standard layout.

17. A non-transitory computer-readable medium comprising one or more computer-executable instructions that, when executed by at least one processor of a computing device, cause the computing device to:

in response to a detected selection of a video game via a first screen device, convert a second screen device to a video game controller featuring a standard layout on a display of the second screen device, wherein the standard layout emulates a physical video game controller;

detect a trigger event associated with the video game that necessitates a layout change for the second screen device;

determine a custom-built layout that corresponds to the trigger event, wherein the custom-built layout enables a functionality not in the standard layout and differs from the standard layout of at least one other second screen device of a different user of an instance of the video game; and transmit, to the second screen device, one or more instructions for displaying the custom-built layout that causes the second screen device to replace the standard layout with the custom-built layout.

18. The non-transitory computer-readable medium of claim 17, wherein:

the standard layout emulates a physical video game controller, and the custom-built layout provides unique second screen device controller functionality comprising one or more of rich user interactions or hidden information gameplay.

19. The non-transitory computer-readable medium of claim 18, wherein the rich user interactions comprise one or more of swipe touch gestures on the second screen device, zoom touch gestures on the second screen device, drag-and-drop touch gestures on the second screen device, pan touch gestures on the second screen device, displayed object rotation touch gestures on the second screen device, gyroscopic interactions using the second screen device, or microphone interactions using the second screen device.

20. The non-transitory computer-readable medium of claim 18, wherein the hidden information gameplay comprises video game information that is displayed only on the second screen device and not on the first screen device or any other device being used as a video game controller relative to the video game.

* * * * *